United States Patent [19]
Saito et al.

[11] 3,984,522
[45] Oct. 5, 1976

[54] METHOD OF REMOVING NITROGEN MONOXIDE FROM A NITROGEN MONOXIDE-CONTAINING GAS

[75] Inventors: Takeshiro Saito; Takuzo Sekiya; Hitoshi Takagi; Kosaku Washio, all of Kurashiki, Japan

[73] Assignee: Asahi Kasei Kogyo Kabushiki Kaisha, Osaka, Japan

[22] Filed: Sept. 20, 1974

[21] Appl. No.: 508,139

[30] Foreign Application Priority Data
Sept. 24, 1973 Japan.............................. 48-107397
Oct. 23, 1973 Japan.............................. 48-118474

[52] U.S. Cl................................. 423/235; 423/351
[51] Int. Cl.$^2$........................................ C01B 21/00
[58] Field of Search..................... 423/235, 239, 351

[56] References Cited
UNITED STATES PATENTS
3,565,813 2/1971 Bersworth............................ 423/351

FOREIGN PATENTS OR APPLICATIONS
1,454,723 1966 France................................ 423/235
1,251,900 1967 Germany............................ 423/236

*Primary Examiner*—Earl C. Thomas
*Assistant Examiner*—Eugene T. Wheelock
*Attorney, Agent, or Firm*—Burgess, Dinklage & Sprung

[57] ABSTRACT

A method for removing nitrogen monoxide effectively from a nitrogen monoxide-containing gas which comprises contacting a nitrogen monoxide-containing gas with an aqueous solution containing a ferrous ion complex formed from a ferrous ion and an organic compound of 2 to 24 carbon atoms having in the molecule at least one atomic group selected from mercapto, amino, imino and nitrilo groups. When a sulfite or sulfide is present in the above aqueous solution, the nitrogen monoxide-absorbing capacity of the aqueous solution can be enhanced and nitrogen monoxide absorbed in the aqueous solution is reduced to non-toxic nitrogen. According to this method, nitrogen monoxide can be removed effectively, even if the gas to be treated contains an oxidizing substance such as oxygen.

7 Claims, No Drawings

METHOD OF REMOVING NITROGEN MONOXIDE FROM A NITROGEN MONOXIDE-CONTAINING GAS

This invention relates to a method of washing a nitrogen monoxide-containing gas and removing nitrogen monoxide therefrom.

It is well known that sulfur dioxide and nitrogen dioxide are poisonous to the human body and the like. In contrast, sufficient knowledge has not been obtained about the effect of nitrogen monoxide, for example, on the human body. It is known, however, that nitrogen monoxide discharged into the open air is oxidized to nitrogen dioxide by the actions of light, ozone and oxygen. Thus, nitrogen monoxide is converted to very poisonous nitrogen dioxide, and in this sense it can be said that nitrogen monoxide is a very poisonous substance. Accordingly, it is not permitted to discharge nitrogen monoxide into the open air without any restriction, and a problem of prevention of air pollution by nitrogen monoxide is one of the important social problems to be solved at the present time.

This invention has been developed as one solution of this problem and it is a primary object of this invention to provide a method of washing a nitrogen monoxide-containing gas and removing nitrogen monoxide therefrom.

Nitrogen oxides contained in the exhaust gases generated from installed combustion equipment such as boilers, heating furnaces and glass melting furnaces and from nitric acid producing plants and metal surface treatment plants are composed mainly of nitrogen monoxide and nitrogen dioxide, and especially in nitrogen oxides generated from the fixed installed combustion equipments, the content of nitrogen monoxide is much higher than the content of nitrogen dioxide. For example, it is said that 90 to 95% or more of the nitrogen oxide contained in a boiler exhaust gas is nitrogen monoxide.

It is very difficult to remove nitrogen monoxide from such exhaust gas, and no satisfactory washing method for removal of nitrogen monoxide has been proposed as yet. As one of known methods, there can be mentioned a method comprising washing a nitrogen monoxide-containing gas with an alkali aqueous solution containing a strong oxidizing agent such as potassium permanganate. This method utilizes such a phenomenon that nitrogen dioxide and dinitrogen trioxide (formed when nitrogen monoxide and nitrogen dioxide are present in equimolar amounts) are acidic substances and are readily absorbed in an alkali aqueous solution, though nitrogen monoxide is hardly absorbed in water or an alkali aqueous solution. It is considered that in this method nitrogen monoxide to be removed is oxidized to nitrogen dioxide and it is absorbed in an alkali aqueous solution in the form of nitrogen dioxide or dinitrogen trioxide. This method, however, is disadvantageous in that since the oxidizing agent to be used is expensive, the running cost is very high and this method includes a risk of secondary pollution because the waste water discharged from the process contains manganese which is regarded as a toxic heavy metal.

There is also known a method using hydrogen peroxide as the oxidizing agent. This method, however, is insufficient in the following points. Since the efficiency of oxidation of nitrogen monoxide by hydrogen peroxide is low, it is impossible to remove nitrogen monoxide from the exhaust gas effectively, and since hydrogen peroxide is unstable and is readily decomposed, a large amount of hydrogen peroxide is necessary, thereby causing the running cost to be high.

Trials have been made to remove nitrogen monoxide by direct absorption without oxidation of nitrogen monoxide. For example, it is known that when a nitrogen monoxide-containing gas is contacted with an aqueous solution containing ferrous sulfate, a nitrogen monoxide complex, i.e., ferrous nitrosylsulfate is formed according to the following reaction formula (See, J. Appl. Chem. USSR., 26, 927, 1953):

$$FeSO_4 + No \rightarrow Fe(NO)SO_4 \qquad (1)$$

This fact was already known in the 1950's at latest, but it has not been reported that nitrogen monoxide could be removed from an exhaust gas on an industrial scale according to this method.

This method has the following two fatal defects; the nitrogen monoxide complex-forming capacity of a solution of ferrous sulfate is very small and the rate of reaction between ferrous sulfate and nitrogen monoxide is very low.

In fact, in our experiments it was confirmed that when a gas containing about 1000 ppm of nitrogen monoxide is contacted with an aqueous solution containing ferrous sulfate, nitrogen monoxide is hardly absorbed or removed (See, Comparative Example 1 given hereinafter). Accordingly, it is substantially impossible, according to this prior art method, to remove nitrogen monoxide contained in an exhaust gas at a very dilute concentration (for example, the concentration of nitrogen monoxide in a boiler exhaust gas is very low and usually below about 1000 ppm).

In view of the foregoing state of the art, we made extensive and intensive investigations on an effective washing method for removal of nitrogen monoxide. As a result we have found that when an aqueous solution containing a complex of ferrous ion is used, absorption and removal of nitrogen monoxide, which is very difficult to remove according to the conventional techniques, can be effectively accomplished, and that when a sulfite or sulfide is present in this aqueous solution and the resulting solution is used as an absorbing liquid, nitrogen monoxide absorbed is reduced to nitrogen and hence, the absorbing liquid can retain a considerably high nitrogen monoxide-washing effect substantially permanently without loss of the nitrogen monoxide-absorbing capacity.

More specifically, in accordance with one aspect of this invention, there is provided a method of washing a nitrogen monoxide-containing gas and removing nitrogen monoxide therefrom, which comprises contacting a nitrogen monoxide-containing gas with an aqueous solution containing as an active ingredient a ferrous ion complex formed from ferrous ion and a specific organic compound thereby to cause nitrogen monoxide to be absorbed in the aqueous solution directly without oxidation of the nitrogen monoxide to nitrogen dioxide.

In accordance with another aspect of the invention, there is also provided a method of washing a nitrogen monoxide-containing gas and removing nitrogen monoxide therefrom, which comprises including a sulfite or sulfide in the above aqueous solution or the nitrogen monoxide-absorbed solution recovered from the above method, to thereby reduce the absorbed nitrogen monoxide to harmless nitrogen.

According to the above methods of this invention, since the nitrogen monoxide-absorbing capacity of the absorbing liquid is much greater than that of an aqueous solution of ferrous sulfate, namely an aqueous solution containing a free ferrous ion alone, which is used as an absorbing liquid in the conventional method, and since the rate of the absorbing reaction is very high in the case of the absorbing liquid to be used in this invention, nitrogen monoxide can be effectively removed even if its concentration is very low.

The chemical ingredient to react with nitrogen monoxide in this invention is a complex of ferrous ion formed by coordination between the free ferrous ion and the majority or part of an organic compound which is also present in the aqueous solution. To our surprise, it has been found that this complex has properties quite different from those of the free ferrous ion, and that the complex is highly reactive with nitrogen monoxide. Accordingly, nitrogen monoxide can be removed very effectively according to the method of this invention.

As the organic compound present along with ferrous ion in the method of this invention, there can be mentioned organic compounds of 2 to 24 carbon atoms having in the molecule at least one atomic group selected from mercapto, amino, imino, and nitrilo groups, and salts of these organic compounds. Specific examples of such organic compounds are illustrated below.

1. Mercaptocarboxylic acids having 2 to 6 carbon atoms such as thioglycolic acid, mercaptosuccinic acid, dimercaptosuccinic acid, mercaptoethyliminodiacetic acid, cysteine and o-mercaptobenzoic acid.
2. Amines having 2 to 6 carbon atoms such as ethylenediamine, triethylenediamine, N,N'-di(2-hydroxyethyl)ethylenediamine, 1,2-diaminopropane, diethylenetriamine, trimethylenetetraamine, triethylenetetraamine, 2,2',2''-triaminotriethylamine and 2,2',2''-trihydroxytriethylamine.
3. Aminopolycarboxylic acids having 4 to 24 carbon atoms such as aspartic acid, iminodiacetic acid, iminodipropionic acid, phenyliminodiacetic acid, hydroxyethyliminodiacetic acid, hydroxyethyliminodipropionic acid, aminoethyliminodiacetic acid, nitrilotriacetic acid, nitrilotripropionic acid, ethylenediamine-N,N'-diacetic acid, ethylenediamine-N,N'-dipropionic acid, N-hydroxyethylethylenediamine-N,N',N'-triacetic acid, ethylene diamine-tetraacetic acid, ethylenediamine-tetrapropionic acid, 1,2-propylenediamine-tetraacetic acid, trans-cyclohexane-1,2-diamine-tetraacetic acid, 1,2-diaminopropane-N,N,N',N'-tetraacetic acid, diethylenetriamine-N,N,N',N'',N''-pentaacetic acid, trimethylenetetraamine-hexaacetic acid, triethylenetetraamine-hexaacetic acid and triethylenetetraamine-hexapropionic acid.

These organic compounds may be used singly or in the form of mixtures. Further, lithium, potassium, sodium, magnesium, calcium and ammonium salts of these organic compounds may also be used in this invention.

Among these organic compounds, aminopolycarboxylic acids may preferably be employed. Of these aminopolycarboxylic acids, those having 1 to 4 nitrilo groups are excellent in chemical durability and other properties, and especially when nitrilotriacetic acid, nitrilotripropionic acid, N-hydroxyethylethylenediamine-N,N',N'-triacetic acid, ethylenediamine-tetraacetic acid, ethylenediamine-tetrapropionic acid, 1,2-propylenediamine-tetraacetic acid, diethylenetriamine-N,N,N',N'',N''-pentaacetic acid and mono- to pentasodium salts of these acids are employed, ferrous ion complexes which are very reactive with nitrogen monoxide are formed and since these complexes are easily soluble in water, nitrogen monoxide can be removed very effectively.

In this invention, selection of the above-mentioned specific organic compounds as thwe organic compound present along with the ferrous ion is very important. More specifically, organic compounds other than exemplified above can form complexes with ferrous ions. For instance sodium formate, malonic acid, succinic acid, glycolic acid, lactic acid, citric acid, oxalic acid and the like can form complexes with ferrous ions, but as is illustrated in Comparative Examples given hereinafter, these complexes are much inferior to ferrous ion complexes of the organic compounds to be used in this invention with respect to the nitrogen monoxide-removing effect.

As the ferrous ion-providing substance to be used in this invention, there can be mentioned, for example, ferrous sulfate, ferrous chloride, ferrous nitrate and ammonium ferrous sulfate, though the ferrous ion-providing substances that can be used in this invention are not limited to these ferrous salts. Use of ferrous sulfate and ferrous chloride is especially preferred in this invention, because these ferrous salts have a relatively high solubility in water.

Good results can be obtained when the ferrous ion concentration is at least 0.01 gram ion per liter of $H_2O$. There is no critical reason for specifying the upper limit of the ferrous ion concentration in this invention, but the ferrous ion concentration in the range of 0.01 to 0.5 gram ion per liter of $H_2O$ is usually employed from a practical point of view. If the ferrous ion concentration is lower than 0.01 gram ion per liter of $H_2O$, it is difficult to attain effective removal of nitrogen monoxide (See, results of Referential Examples 1 and 2 shown in Table 2 given hereinafter). Thus, use of an aqueous solution having such low ferrous ion concentration is not preferred in this invention.

The organic compound is added to the ferrous ion-containing aqueous solution in an amount in the range of 0.01 to 100 moles per gram ion of the ferrous ion. If the amount of the organic compound is less than the lower limit of the above-mentioned range, for example, 0.001 mole per gram ion of the ferrous ion, the nitrogen monoxide removal ratio is only 32% and hence, nitrogen monoxide cannot be removed effectively (See, Referential Example 5 given hereinafter). It is possible to employ the organic compound in an amount exceeding the range as mentioned above, but no particular advantage is brought about by addition of such a large amount of the organic compound.

As the sulfites and sulfides to be used in this invention, there can be mentioned orthosulfites, acid sulfites and sulfides of potassium, sodium, ammonium, magnesium and calcium. They may be employed alone or in mixtures. In this invention, by the term "sulfite" are meant orthosulfites and acid sulfites, and use of potassium sulfite and sodium sulfite is especially preferred in this invention. Good results are obtained when the sulfite or sulfide is incorporated in the absorbing liquid in a concentration of 0.01 to 3.0 moles per liter of water.

Sulfites and sulfides to be used in this invention can be obtained, for example, by reacting a hydroxide or carbonate of potassium, sodium, magnesium or the like with sulfur dioxide or hydrogen sulfide according to known methods represented by the following reaction formulae (2) to (4):

$$2NaOH + SO_2 \rightarrow Na_2SO_3 + H_2O \qquad (2)$$

$$Na_2SO_3 + SO_2 + H_2O \rightarrow 2NaHSO_3 \qquad (3)$$

$$2NaOH + H_2S \rightarrow Na_2S + 2H_2O \qquad (4)$$

From the economical viewpoint, it is preferred and advantageous that sulfites are prepared by utilizing sulfur dioxide contained in an exhaust gas discharged from a fuel oil combustion boiler or the like.

In practicing the method employing a sulfite and/or sulfide, the sulfite and/or sulfide may be employed in such a manner that they are present along with the ferrous ion complex in the absorption zone. Alternatively, there may be employed a mode in which, after the absorbing solution containing the ferrous ion complex has been contacted with a nitrogen monoxide-containing gas, at least one member selected from the group consisting of sulfites and sulfides is added, in the powdery form or in the form of an aqueous solution, to the absorbing solution so that the nitrogen oxide caught by the absorbing solution is reduced to nitrogen.

Use of sulfites and/or sulfides in the method of this invention renders the method further advantageous. For example, when an exhaust gas containing not only nitrogen monoxide but also sulfur dioxide is contacted with an aqueous solution containing a ferrous ion complex and orthosulfite, nitrogen monoxide and sulfur dioxide can be simultaneously removed effectively, as is apparent from the above reaction formulae (2) and (3).

It is further to be noted that, according to the above preferred method of this invention, it is possible to remove nitrogen monoxide effectively even if an oxidizing substance such as oxygen is contained in the exhaust gas, and therefore, this method of the present invention has a great practical and industrial value. Illustratively stated, even when the ferrous ion complex is oxidized by oxygen or the like and it is thus converted to a ferric ion complex having no substantial activity for removal of nitrogen monoxide (See, Referential Example 13 given hereinafter), since the resulting ferric ion complex is re-converted to the ferrous ion complex by the sulfite and/or sulfide which are present in the absorption zone, nitrogen oxide can be removed effectively even from an oxygen-containing exhaust gas. Therefore, when this preferred method using a sulfite or sulfide is adopted, it is not indispensable to use a ferrous compound as the ferrous ion source, but a sufficient washing effect can be attained even when a ferric compound is used as the ferrous ion source.

As is apparent from the foregoing description, the sulfite or sulfide to be used in this invention acts as a reducing agent in the following two main reactions; the reaction of reducing nitrogen monoxide taken up in the absorbing liquid by the ferrous ion complex to nitrogen and the reaction of reducing a ferric ion complex formed as a by-product in the absorbing liquid by an oxidizing substance such as oxygen, to the original ferrous ion complex.

Control of the pH of the absorbing liquid is very important for practicing the method of this invention effectively. Illustratively stated, good results can be obtained when the pH of the absorbing liquid is within a range of 2.0 to 13.0, though optimum pH values vary to some extent depending on the kind of the organic compound used. When the pH value is below the above range, the hydrogen ion prevents bonding of the ferrous ion and ligand, and hence, the resulting complex is unstable or no complex is formed at all, resulting in drastic reduction of the nitrogen monoxide-absorbing capacity (See, Referential Examples 3 and 4 given hereinafter). Accordingly, such low pH values are not preferred. No particular disadvantage is brought about even when the pH value of the absorbing liquid exceeds the above range. However, at too high a pH value the ferrous ion complex becomes unstable and the nitrogen monoxide removal ratio is rather reduced. Further, no particular effect is attained by elevation of the pH value. Accordingly, too high pH values are not adopted in this invention. When it is intended to remove sulfur dioxide as well as nitrogen monoxide according to the preferred embodiment of this invention using a sulfite or sulfide, it is preferred that the pH of the absorbing solution is adjusted to 5.0 to 8.0.

In this invention, the temperature at which a nitrogen monoxide-containing gas is contacted with the absorbing solution is not particularly critical, and the contact can be accomplished conveniently at 0 to 100°C., at which water is present stably in the liquid phase. For example, even at a relatively low temperature as low as about 20°C. the absorbing reaction is allowed to proceed at a sufficient rate, and at such a high temperature as of about 80°C. nitrogen monoxide can be removed effectively. It is practically preferred that the contact between the absorbing solution and nitrogen monoxide-containing gas is conducted at a temperature ranging from 10° to 90°C.

In general, the method of this invention is practiced under atmospheric pressure, but it is possible to work the method under an elevated pressure of up to several atmospheres or a reduced pressure of several hundred millimeters of water column.

In practicing the method of this invention, the ratio of liquid (absorbing liquid or solution) to gas (gas to be contacted) may be varied depending upon the type of the absorbing apparatus employed, but may generally be in the range of 0.5 to 100, more preferably 2 to 30 (liter/m³ in the normal state). The time of contacting a gas with a liquid is not particularly critical but may be in the range of 0.1 to 60, more preferably 0.5 to 20 seconds.

The kind of the apparatus to be used for practice of method of this invention is not particularly critical, and any known apparatuses used in this field, such as a bubble column, a spray column, a packed column, a wetted-wall column and a venturi scrubber can be used in this invention.

In this invention, good results are generally obtained when a homogeneous aqueous solution is used as the absorbing liquid, but even when a part of the organic compound or iron compound is suspended in the undissolved state in the absorbing liquid, the intended effect can be attained.

This invention will now be described in more detail by reference to the following Examples that by no means limit the scope of this invention.

EXAMPLES 1 TO 23

A 250 ml.-inner capacity gas-washing bottle equipped with a glass filter was charged with 150 ml. of an aqueous solution having a composition shown in Table 1 (hereinafter referred to as "absorbing liquid"). The pH of the absorbing liquid was adjusted using sodium hydroxide or sulfuric acid according to need. A gas containing 1030 ppm. of nitrogen monoxide, the balance being nitrogen, was introduced into the washing bottle at a flow rate of 30 liters/hr and was contacted with the absorbing liquid under atmospheric pressure. The treated gas continuously discharged from the upper portion of the washing bottle was introduced into a nitrogen oxide analyzer of the redox potential method type (manufactured and sold by Dina Science Co., U.S.A.) to trace continuously the nitrogen monoxide concentration in the purge gas. Results obtained are shown in Table 1.

The ratio of removal of nitrogen monoxide (NO) is expressed as the mean value obtained when the test was conducted for 1 hour. Ferrous sulfate heptahydrate was used as the ferrous ion-providing substance.

COMPARATIVE EXAMPLE 1

The test was conducted in the same manner as in Example 1 except that an aqueous solution containing ferrous sulfate alone and no organic compound and having a pH value of 3.8 was used as the absorbing liquid. Results obtained are shown in Table 1.

From Table 1, it is seen that in this Comparative Example, the nitrogen monoxide removal ratio was only 2%. It will be readily understood that it is substantially impossible to remove nitrogen monoxide by using an aqueous solution containing a free ferrous ion alone.

In contrast, according to a present invention, the nitrogen monoxide removal ratio as high as 99% can be attained as in Examples 1 to 6, 11, 13 and 18 to 22, even by using a very simple apparatus such as described above. Thus, it will be readily understood that a ferrous ion complex-containing absorbing liquid of this invention has a very high nitrogen monoxide removing activity.

COMPARATIVE EXAMPLES 2 TO 8

The test was conducted in the same manner as in Example 1 except that organic compounds outside the scope of this invention, such as shown in Table 1, were used. Results obtained are shown in Table 1 for comparison.

In ferrous ion complexes, it is well known that among atoms in the atomic group bonded to the ferrous ion, the atom forming the coordination bond with the ferrous ion, namely the donor atom, has the greatest influence on properties of the complex. In each of Comparative Examples 2 to 8, the ferrous ion complex has oxygen alone as the donor atom. From the results shown in Table 1, it is apparent that such ferrous ion complexes are much inferior to ferrous ion complexes of this invention with respect to the reactivity with nitrogen monoxide. More specifically, in Examples 1 to 6, 11, 13 and 18 to 22 according to this invention, the nitrogen monoxide removal ratio was as high as 99%, while in Comparative Example 7 the nitrogen monoxide removal ratio was as low as 56% though the ferrous ion concentration was the same as in Examples 1 to 6, 11, 13 and 18 to 22.

In view of the foregoing, it will be readily understood that a complex having a surprisingly high reactivity with nitrogen monoxide can be formed only when sulfur and/or nitrogen is coordinated with the ferrous ion.

REFERENTIAL EXAMPLES 1 TO 13

The test was conducted in the same manner as in Example 1 except that the composition or pH value of the absorbing liquid was changed as indicated in Table 2. Results obtained are shown in Table 2 for reference.

Table 1

| Example No. | $Fe^{2+}$ Concentration (g-ion/liter-$H_2O$) | Organic Compound (mole/liter-$H_2O$) | pH of Absorbing Liquid | Contact Temperature (°C) | Nitrogen Monoxide (NO) Removal Ratio (%) |
|---|---|---|---|---|---|
| 1 | 0.2 | sodium thioglycolate (0.2) | 6.7 | 20 | 99 |
| 2 | 0.2 | L-cysteine (0.2) | 7.0 | 20 | 99 |
| 3 | 0.2 | o-mercaptobenzoic acid (0.2) | 4.8 | 20 | 99 |
| 4 | 0.2 | ethylenediamine (0.2) | 8.1 | 20 | 99 |
| 5 | 0.2 | triethylenediamine (0.2) | 7.8 | 20 | 99 |
| 6 | 0.2 | D,L-aspartic acid (0.2) | 8.1 | 20 | 99 |
| 7 | 0.2 | iminodiacetic acid (0.2) | 6.3 | 20 | 82 |
| 8 | 0.2 | nitrilotriacetic acid (0.2) | 5.0 | 20 | 98 |
| 9 | 0.2 | ethylenediamine-N,N'-diacetic acid (0.1) | 7.6 | 20 | 89 |
| 10 | 0.2 | ethylenediamine-N,N'-dipropionic acid (0.1) | 6.7 | 20 | 90 |
| 11 | 0.2 | N-hydroxyethyl-ethylenediamine-N,N',N'-triacetic acid (0.1) | 6.4 | 20 | 99 |
| 12 | 0.2 | ethylenediamine-tetraacetic acid (0.1) | 2.0 | 20 | 83 |
| 13 | 0.2 | ethylenediamine- | 6.7 | 80 | 99 |

Table 1-continued

| Example No. | Composition of Absorbing Liquid $Fe^{2+}$ Concentration (g-ion/liter-$H_2O$) | Organic Compound (mole/liter-$H_2O$) | pH of Absorbing Liquid | Contact Temperature (°C) | Nitrogen Monoxide (NO) Removal Ratio (%) |
|---|---|---|---|---|---|
| 14 | 0.2 | tetraacetic acid (0.1) ethylenediamine-tetraacetic acid (0.1) | 11.8 | 20 | 98 |
| 15 | 0.2 | ethylenediamine-tetraacetic acid (0.1) | 13.0 | 20 | 96 |
| 16 | 0.2 | ethylenediamine-tetraacetic acid (0.002) | 7.7 | 20 | 97 |
| 17 | 0.01 | ethylenediamine-tetraacetic acid (0.1) | 6.5 | 20 | 80 |
| 18 | 0.2 | tetrasodium ethylenediamine-tetraacetate (0.2) | 6.6 | 20 | 99 |
| 19 | 0.2 | calcium disodium ethylenediamine-tetraacetate (0.2) | 6.8 | 20 | 99 |
| 20 | 0.2 | diammonium ethylenediamine-tetraacetate (0.2) | 6.8 | 20 | 99 |
| 21 | 0.2 | diethylenetriamine-N,N,N',N'',N''-pentaacetic acid (0.1) | 7.9 | 20 | 99 |
| 22 | 0.2 | 1,2-diaminopropane-N,N,N',N'-tetraacetic acid (0.1) | 6.3 | 20 | 99 |
| 23 | 0.2 | triethylenetetra-aminehexapropionic acid (0.1) | 6.7 | 20 | 90 |
| Comparative Example 1 | 0.2 | not added | 3.8 | 20 | 2 |
| Comparative Example 2 | 0.2 | sodium formate (0.2) | 7.2 | 20 | 20 |
| Comparative Example 3 | 0.2 | malonic acid (0.2) | 6.1 | 20 | 42 |
| Comparative Example 4 | 0.2 | succinic acid (0.2) | 6.2 | 20 | 25 |
| Comparative Example 5 | 0.2 | glycolic acid (0.2) | 7.5 | 20 | 41 |
| Comparative Example 6 | 0.2 | lactic acid (0.2) | 7.0 | 20 | 26 |
| Comparative Example 7 | 0.2 | citric acid (0.2) | 5.3 | 20 | 56 |
| Comparative Example 8 | 0.2 | oxalic acid (0.2) | 4.2 | 20 | 0 |

Table 2

| Referential example No. | Composition of Absorbing Liquid | | | | pH of Absorbing Liquid | Contact Temperature (°C) | Nitrogen Monoxide (NO) Removal Ratio (%) |
|---|---|---|---|---|---|---|---|
| | Metal Salt | | Organic Compound | | | | |
| | Kind | Concentration (mole/Liter-$H_2O$) | Kind | Concentration (mole/liter-$H_2O$) | | | |
| 1 | $FeSO_4$ | 0.001 | ethylenediamine-tetraacetic acid | 0.1 | 7.8 | 20 | 2 |
| 2 | $FeSO_4$ | 0.005 | " | 0.1 | 6.9 | 20 | 38 |
| 3 | $FeSO_4$ | 0.2 | " | 0.2 | 0.9 | 20 | 2 |
| 4 | $FeSO_4$ | 0.2 | " | 0.2 | 1.5 | 20 | 27 |
| 5 | $FeSO_4$ | 0.2 | " | 0.0002 | 7.5 | 20 | 32 |
| 6 | not added | | " | 0.2 | 6.9 | 20 | 0 |
| 7 | not added | | triethylenediamine | 0.2 | 11.3 | 20 | 0 |
| 8 | not added | | sodium hydroxide | 1.2 | 13.4 | 20 | 0 |
| 9 | CuCl | 0.2 | ethylenediamine-tetraacetic acid | 0.2 | 4.3 | 20 | 2 |
| 10 | $CuSO_4$ | 0.2 | " | 0.2 | 5.1 | 20 | 2 |
| 11 | $MnSO_4$ | 0.2 | " | 0.2 | 8.5 | 20 | 2 |
| 12 | $NiSO_4$ | 0.2 | " | 0.2 | 7.2 | 20 | 2 |
| 13 | $Fe_2(SO_4)_3$ | 0.2 | " | 0.2 | 6.7 | 20 | 3 |

EXAMPLE 24

This Example is given for better and further illustration of this invention. Illustratively stated, when the results obtained in this Example are compared with those obtained in Example 25 given hereinafter, advantage attained by addition of a sulfite or sulfide to the absorbing liquid or solution will readily be understood.

The ferrous ion concentration adopted in this Example corresponds to the lower limit specified in this invention.

The test was conducted in the same manner as in Example 1 except that 150 ml. of an aqueous solution containing 0.01 mole/liter-$H_2O$ of ferrous sulfate and 0.01 mole/liter-$H_2O$ of ethylenediaminetetraacetic acid and having a pH value of 7.3 was used as the absorbing liquid.

30, 60, 90 and 100 minutes after the start of the test, the nitrogen monoxide removal ratios were determined and evaluated as 84, 35, 2 and 0%, respectively.

From the above results, it will be readily understood that when an aqueous solution containing a ferrous ion complex alone is used, there is a limit in the nitrogen monoxide-absorbing capacity and the absorbing liquid has lost its activity of absorbing nitrogen monoxide after passage of a certain period.

The total amount of nitrogen monoxide removed from the gas over a period of 100 minutes corresponded to $1.0 \times 10^{-3}$ mole.

EXAMPLE 25

The test was conducted in the same manner as in Example 1 except that 150 ml. of an aqueous solution containing 0.01 mole/liter-$H_2O$ of ferrous sulfate heptahydrate, 0.01 mole/liter-$H_2O$ of ethylenediaminetetraacetic acid and 0.04 mole/liter-$H_2O$ of sodium sulfite and having a pH value of 6.9 was used as the absorbing liquid.

30, 60, 90, 120 and 300 minutes after the start of the test the nitrogen monoxide removal ratios were determined and evaluated as 92, 77, 65, 65 and 65%, respectively. It is seen that about 90 minutes after the start of the test, the nitrogen monoxide removal ratio was kept at a certain level (hereinafter referred to as "equilibrium nitrogen monoxide removal ratio") with no substantial change. This fact indicates that the reaction of catching nitrogen monoxide by the ferrous ion complex and the reaction of reducing the thus caught nitrogen monoxide to nitrogen are simultaneously caused to proceed in the absorbing liquid. We confirmed by gas chromatography the fact that the absorbed nitrogen monoxide was converted to nitrogen in the above test.

The total amount of nitrogen monoxide removed from the gas over a period of 5 hours from the start of the contact of the gas with the absorbing liquid was $4.3 \times 10^{-3}$ mole, which is about 4 times as large as the total amount of nitrogen monoxide removed from the gas in Example 24.

COMPARATIVE EXAMPLE 9

The test was conducted in the same manner as in Example 1 except that 150 ml. of an aqueous solution containing 0.01 mole/liter-$H_2O$ of ferrous sulfate heptahydrate and 0.04 mole/liter-$H_2O$ sodium sulfite and having a pH value of 7.4 was used as the absorbing liquid.

30, 60, 90, 120 and 300 minutes after the start of the test the nitrogen monoxide removal ratios were determined and evaluated as 32, 29, 22, 17 and 13%, respectively. It is seen that in this Comparative Example the nitrogen monoxide removal ratio at each time was much lower than that attained in Example 25, though the concentrations of ferrous sulfate and sodium sulfite in the absorbing liquid were the same as in Example 25. The total amount of nitrogen monoxide removed from the gas over a period of 5 hours was as low as $1.1 \times 10^{-3}$ mole, which corresponds to about one-fourth of the total amount of nitrogen monoxide removed over a period of 5 hours in Example 25.

EXAMPLES 26 TO 36

The test was conducted in the same manner as in Example 1 except that 150 ml. of an aqueous solution having a composition shown in Table 3 was used as the absorbing liquid, and the equilibrium nitrogen monoxide removal ratio was determined to obtained results shown in Table 3.

Table 3

| Example No. | $FeSO_4$ Concentration (mole/liter-$H_2O$) | Composition of Absorbing Liquid | | | | Equilibrium Nitrogen Monoxide (NO) Removal Ratio (%) |
|---|---|---|---|---|---|---|
| | | Sulfite or Sulfide | | Organic Compound | | |
| | | Kind | Concentration (mole/liter-$H_2O$) | Kind | Concentration (mole/liter-$H_2O$) | |
| 26 | 0.01 | $K_2SO_3$ | 0.04 | ethylenediamine-tetraacetic acid | 0.01 | 72 |
| 27 | 0.01 | $(NH_4)_2SO_3$ | 0.04 | " | 0.01 | 62 |
| 28 | 0.01 | $MgSO_3$ | 0.04 | " | 0.01 | 53 |
| 29 | 0.01 | $Na_2S$ | 0.04 | " | 0.01 | 28 |
| 30 | 0.01 | $(NH_4)_2S$ | 0.04 | " | 0.01 | 26 |
| 31 | 0.05 | $K_2S$ | 0.2 | " | 0.05 | 91 |
| 32 | 0.05 | $Na_2SO_3$ | 0.2 | nitrilotriacetic acid | 0.05 | 92 |
| 33 | 0.05 | $Na_2SO_3$ | 0.2 | N-hydroxyethylethylene-diamine-N',N'-triacetic acid | 0.05 | 90 |
| 34 | 0.05 | $Na_2SO_3$ | 0.2 | diethylenetriamine-N,N,N',N'',N''-pentaacetic acid | 0.05 | 88 |
| 35 | 0.05 | $Na_2SO_3$ | 0.2 | 1,2-diaminopropane-N,N,N',N'-tetraacetic acid | 0.05 | 86 |
| 36 | 0.05 | $Na_2SO_3$ | 0.2 | triethylenetetraamine-hexapropionic acid | 0.05 | 69 |

EXAMPLE 37

The test was conducted in the same manner as in Example 25 except that an aqueous solution containing 0.04 mole/liter-$H_2O$ of acid sodium sulfite in place of sodium sulfite, the pH value of which was adjusted to 6.9 using sodium hydroxide, was used as the absorbing liquid. The equilibrium nitrogen monoxide removal ratio was found to be 62%.

EXAMPLE 38

The test was conducted in the same manner as in Example 25 except that 150 ml. of an aqueous solution containing 0.1 mole/liter-$H_2O$ of ferrous sulfate heptahydrate, 0.1 mole/liter-$H_2O$ of ethylenediaminetetraacetic acid and 0.2 mole/liter-$H_2O$ of sodium sulfite, the pH value of which was adjusted to 6.2 using sodium hydroxide, was used as the absorbing liquid and a fuel oil combustion boiler exhaust gas containing 621 ppm. of sulfur dioxide, 289 ppm. of nitrogen oxides (more than 97% of which was nitrogen monoxide) and 2.9% of oxygen was fed at a flow rate of 30 liters/hr and contacted with the above absorbing liquid. It was found that 5 hours after the start of the test, the nitrogen monoxide removal ratio was 91% and the sulfur dioxide removal ratio was 98%. From the results of this Example, it will be readily understood that not only nitrogen monoxide but also sulfur dioxide can be removed effectively in the method of this invention and that nitrogen monoxide can be removed at a high efficiency in this invention even when the exhaust gas contains oxygen.

What is claimed is:

1. A method of removing nitrogen monoxide from a nitrogen monoxide-containing gas by reducing the nitrogen monoxide, which comprises contacting a nitrogen monoxide-containing gas with an aqueous solution containing a sulfite and a ferrous ion complex formed from a ferrous ion and an organic compound selected from the group consisting of
    a. thioglycolic acid, mercaptosuccinic acid, dimercaptosuccinic acid, mercaptoethyliminodiacetic acid, cysteine and o-mercaptobenzoic acid,
    b. ethylenediamine, triethylenediamine, N,N'-di(2-hydroxyethyl)ethylenediamine, 1,2-diaminopropane, diethylenetriamine, trimethylenetetraamine, triethylenetetraamine, 2,2',2''-triaminotriethylamine and 2,2',2''-trihydroxytriethylamine,
    c. aspartic acid, iminodiacetic acid, iminodipropionic acid, phenyliminodiacetic acid, hydroxyethyliminodiacetic acid, hydroxyethyliminodipropionic acid, aminoethyliminodiacetic acid, nitrilotriacetic acid, nitrilotripropionic acid, ethylenediamine-N,N'-diacetic acid, ethylenediamine-N,N',N'-triacetic acid, ethylenediamine-tetraacetic acid, ethylenediamine-tetrapropionic acid, 1,2-propylenediamine-tetraacetic acid, trans-cyclohexane-1,2-diamine-tetraacetic acid, 1,2-diaminopropane-N,N,N',N'-tetraacetic acid, diethylenetriamine-N,N,N',N'',N''-pentaacetic acid, trimethylenetetraaminehexaacetic acid, triethylenetetraaminehexaacetic acid and triethylenetetraaminehexapropionic acid, and
    d. lithium, potassium, sodium, magnesium, calcium or ammonium salts of any of (a) to (c), the ferrous ion concentration in the aqueous solution being at least 0.01 gram ion per liter of water, 0.01 to 100 moles of the organic compound being present per gram ion of ferrous ion, the concentration of sulfite plus any sulfide in the aqueous solution being 0.01 to 3.0 mole per liter of water, and the pH value of the aqueous solution being maintained at 2.0 to 13.0.

2. A method according to claim 1 wherein the nitrogen monoxide-containing gas is contacted with the aqueous solution at a temperature of 10 to 90°C.

3. A method according to claim 1 wherein a sulfide is present in the aqueous solution.

4. A method according to claim 1 wherein a sulfide is added in the powdery form or in the form of an aqueous solution to the aqueous solution which has had a contact with the nitrogen monoxide-containing gas and taken up nitrogen monoxide therein, whereby the nitrogen monoxide caught in the solution is reduced to nitrogen.

5. A method according to claim 1 wherein the sulfite is a member selected from the group consisting of a orthosulfite and an acid sulfite of potassium, sodium, ammonium, magnesium and calcium, and mixtures thereof.

6. A method according to claim 5 wherein the sulfite is one obtained by contacting a sulfur dioxide-containing exhaust gas with an aqueous solution containing at least one member selected from hydroxides and carbonates of potassium, sodium, ammonium, magnesium and calcium.

7. A method according to claim 1 wherein the nitrogen monoxide-containing gas is contacted with the aqueous solution while maintaining the pH value of the aqueous solution at 5.0 to 8.0.

* * * * *